(12) United States Patent
Edrington (10) Patent No.: US 8,716,910 B2
(45) Date of Patent: May 6, 2014

(54) STATOR WINDING CONNECTION ARRANGEMENT (75) Inventor: Samuel R. Edrington, Noblesville, IN (US)

(73) Assignee: Remy Technologies LLC, Pendleton, IN (US)

( * ) Notice: Subject to any disclaimer, the term of this patent is extended or adjusted under 35 U.S.C. 154(b) by 387 days.

(21) Appl. No.: 13/010,877

(22) Filed: Jan. 21, 2011

(65) Prior Publication Data

US 2012/0187783 A1 Jul. 26, 2012

(51) Int. Cl.
*H02K 11/00* (2006.01)

(52) U.S. Cl.
USPC ............................................ 310/71; 310/179

(58) Field of Classification Search
USPC ........................................... 310/71, 179, 201
See application file for complete search history.

(56) References Cited

U.S. PATENT DOCUMENTS

| | | | |
|---|---|---|---|
| 6,106,324 A * | 8/2000 | Kwapien et al. | 439/398 |
| 6,784,584 B2 * | 8/2004 | Knoll et al. | 310/179 |
| 6,825,586 B2 | 11/2004 | Edrington | |
| 7,135,799 B2 * | 11/2006 | Rittmeyer | 310/180 |
| 7,348,705 B2 | 3/2008 | Cai et al. | |
| 7,622,843 B2 | 11/2009 | Cai | |

* cited by examiner

*Primary Examiner* — Nguyen N Hanh
(74) *Attorney, Agent, or Firm* — Maginot, Moore & Beck (57) ABSTRACT

An electric machine a cylindrical stator core having an outer perimeter surface and an inner perimeter surface with a plurality of slots formed between the inner perimeter surface and the outer perimeter surface. The inner perimeter surface defines an inner cylindrical space for the stator that extends in an axial direction within the stator. The stator core is configured to retain a winding arrangement comprised of a plurality of conductor segments positioned in the plurality of slots of the stator core. The winding arrangement further includes a jumper extending into the inner cylindrical space and connecting two of the plurality of conductor segments. Accordingly, the jumper appears as a chord of a circular end shape of the stator core.

9 Claims, 6 Drawing Sheets

STATOR WINDING CONNECTION ARRANGEMENT

FIELD

This application relates to the field of electric machines, and more particularly electric machines having windings comprised of segmented conductors.

BACKGROUND

Segmented windings are commonly used in modern electrical machine applications, such as alternators or hybrid-electric vehicles. These windings typically comprise a plurality of segmented conductors that are inserted into slots of the stator and connected at their ends to form phase windings on the stator. Most of the segmented conductors are connected to immediately adjacent conductors. However, jumpers or other connection members are used to provide connections between conductors that are separated from one another on the stator core. These jumpers must be strategically located on the stator in order to reduce crowding between the conductors and jumpers near the end of the stator. If the conductors and jumpers are not strategically positioned, it may be difficult to properly connect the phase windings to a rectifier bridge. Additionally, increased crowding at the end of the stator may introduce increased risk for electrical shorting between the segmented conductors, jumpers and/or terminals.

The segmented conductors may be provided in various forms, but often have a rectangular cross section. Additionally, the segmented conductors are often provided as U-shaped conductors which include two legs and a central U-turn portion between the legs. Thus, the segmented conductors are sometimes referred to as "U-shaped conductors" since their shape can resemble a U. However, the terms "conductor segment" and "segmented conductor" as used herein are not intended to be limited to U-shaped conductors, and instead refers generally to a distinct conductor segment having two ends, whether or not a U-shaped portion is included between the two ends.

Each segmented conductor is positioned in the slots of the stator such that the ends of the legs extend from one end of the stator (i.e., the "connection end" or "weld end" of the stator) and the U-turn portion extends from the opposite end of the stator (i.e., the "insertion side" of the stator). The leg ends are bent and then connected together on the connection end of the stator to form phase windings. The connections between the conductors include connection of adjacent leg ends that are welded together and connections between non-adjacent leg ends that are connected through jumpers.

In a typical segmented winding arrangement, the connection end of the stator tends to be crowded. First, the leg ends, which are already very closely aligned at the connection side, are made even more crowded by the welding points between adjacent leg ends. In addition, the jumpers between windings sets, phase path connections, neutral connections, and terminal connections cause additional jam in the crowded segmented welding points. This makes assembly of the electric machine difficult and increases the risk for potential short circuits and other defects during production.

In addition to crowding at the connection end of the stator, the existence of jumpers and terminals typically requires elongation of the clearance machine at the connection end of the stator. In many applications, such as electric vehicle applications, the compartment holding the electric machine is already crowded and it is difficult to find additional space for the increased clearance of the electric machine at the connection end.

Accordingly, it would be advantageous if a winding arrangement could be provided where the overall clearance required for the electric machine in an application compartment is decreased. It would also be desirable to provide a segmented winding arrangement where the crowding at the connection end of the stator is reduced. It would be of further advantage if such winding arrangement could be provided such that the electric machine may be easily manufactured, thus reducing manufacturing costs. It would also be advantageous if the winding arrangement resulted in decreased incidence of manufacturing errors. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, an electric machine comprises a rotor and a stator. The stator includes a cylindrical stator core having an outer perimeter surface and an inner perimeter surface with a plurality of slots formed between the inner perimeter surface and the outer perimeter surface. The inner perimeter surface defines an inner cylindrical space for the stator that extends in an axial direction within the stator. The stator core is configured to retain a winding arrangement comprised of a plurality of conductor segments positioned in the plurality of slots of the stator core. The winding arrangement further includes a jumper extending into the inner cylindrical space and connecting two of the plurality of conductor segments. Accordingly, the jumper is positioned to the inside of the plurality of conductor segments in the radial direction. In at least one embodiment, the jumper includes a straight portion within the inner cylindrical space. In this embodiment, an end of the stator core defines a circular end shape and the straight portion of the jumper appears as a chord of the circular end shape when the stator core is viewed from the end of the stator core.

The winding arrangement may further include a second jumper and a third jumper in addition to the first jumper. The second jumper is similar to the first jumper and appears as a chord of the circular end shape. The third jumper is generally arc shaped and appears to extend along the circular end shape of the stator core when the stator core is viewed from the end of the stator core. The first jumper and the third jumper may be tied together with an electrically insulative material to better secure the jumpers on the stator core.

In at least one embodiment, the plurality of conductor segments are connected to form a multi-phase delta winding on the stator. In at least one embodiment, the jumper acts as a phase connection member that includes a phase tapping location. The stator may also include additional jumpers that act as phase connection members and series winding connection loops within the winding arrangement.

The above described features and advantages, as well as others, will become more readily apparent to those of ordinary skill in the art by reference to the following detailed description and accompanying drawings. While it would be desirable to provide an electric machine with a stator winding arrangement that provides one or more of these or other advantageous features, the teachings disclosed herein extend to those embodiments which fall within the scope of the

DESCRIPTION

Figure 1:
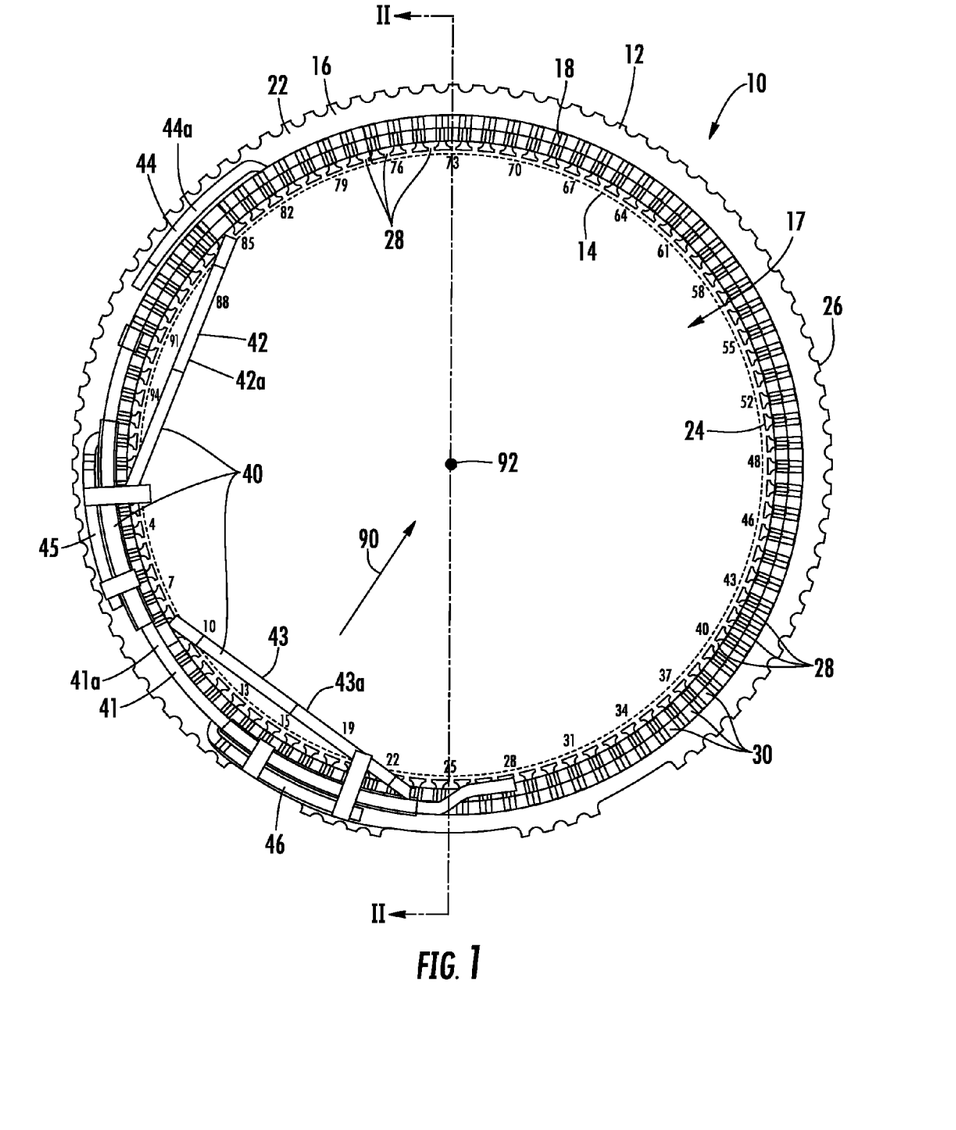
FIG. 1 shows a top view of a stator of an electric machine with a winding connection arrangement positioned on the stator core.
Figure 2:
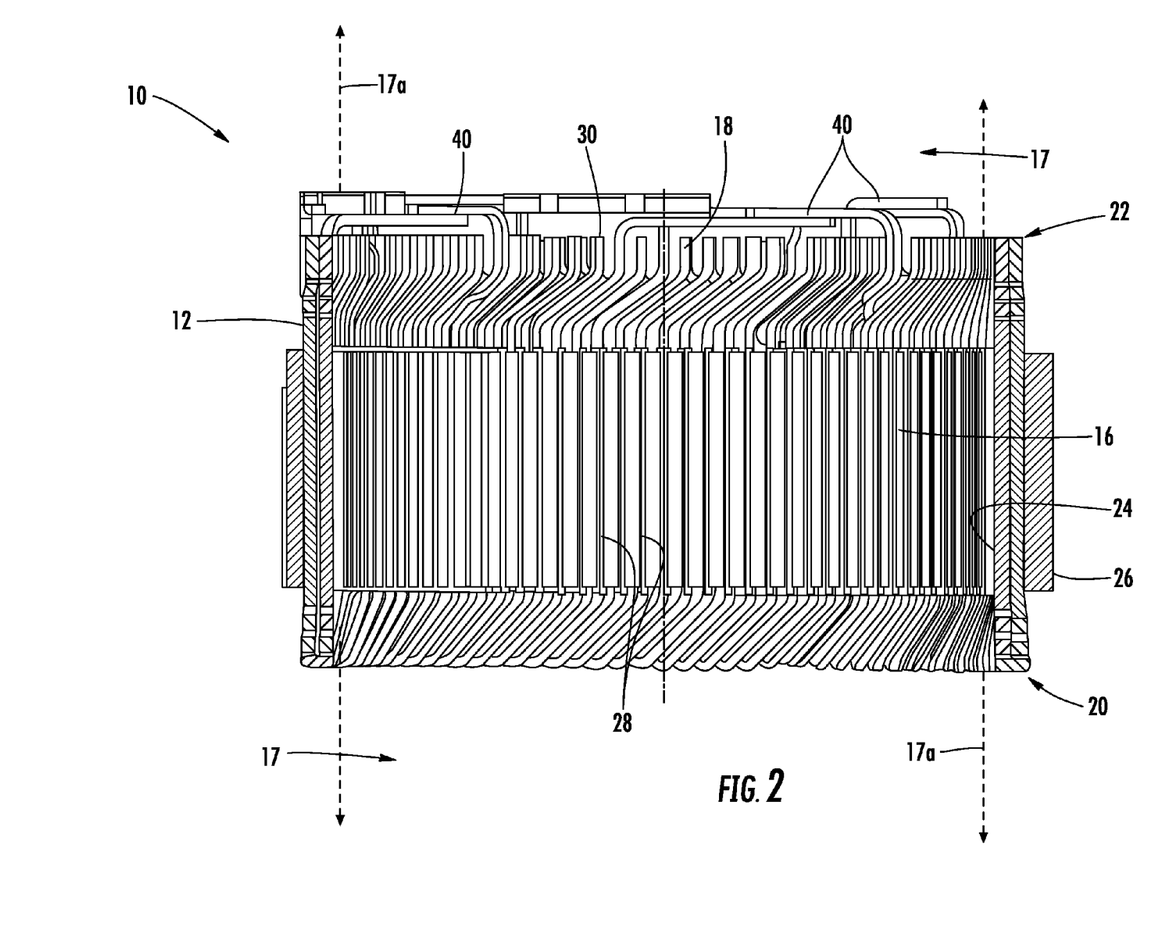
FIG. 2 shows a cross-sectional view of the stator along lines II-II of FIG. 1.

With reference to FIGS. 1 and 2 an electric machine 10 includes a stator 12 and a rotor 14 (the rotor 14 represented in FIG. 1 by dotted lines within the stator 12). The stator 12 includes a stator core 16 with a winding arrangement 18 positioned on the stator core 16. The rotor 14 is positioned inside of the stator core 16 and is configured to induce a current in the winding arrangement 18 when it rotates.

The stator core 16 is comprised of a ferromagnetic material and is typically formed from a plurality of steel sheets that are stamped and stacked upon one another to form a lamination stack. The stator core 16 is generally cylindrical in shape as defined by a center axis 92, and includes an inner perimeter surface 24 and an outer perimeter surface 26. When the stator core 16 is viewed in an axial direction from an end, as shown in FIG. 1, the stator core 16 has a substantially circular or disc shape.

Figure 3:
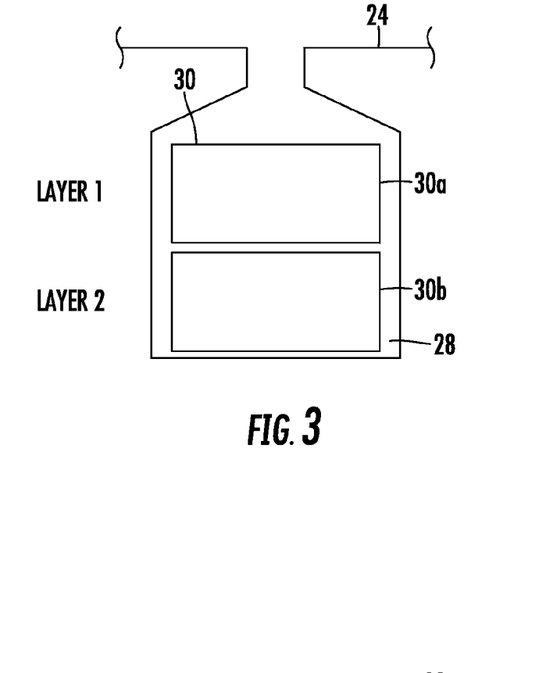
FIG. 3 shows a cross-sectional view of a stator slot of the electric machine of FIG. 1 with segmented conductors in the stator slot.

A plurality of axial slots 28 are formed in the stator core 16 between the inner perimeter surface 24 and the outer perimeter surface 26. In the embodiment of FIG. 1, the stator core 16 includes ninety-six total slots 28. The slots 28 may be semi-closed slots in the stator core 16, as shown in FIGS. 1 and 3, with each slot 28 having a smaller diameter near the inner perimeter surface 24 than the diameter closer to the outer perimeter surface 26. Openings to the semi-closed stator slots 28 are provided through the inner perimeter surface 24 as well as the ends 20 and 22 of the stator core 16.

Winding Arrangement with Segmented Conductors

The stator core 16 is configured to retain the winding arrangement 18 within the slots 28 of the stator core 16. The winding arrangement 18 is comprised of a plurality of segmented conductors 30 placed in the slots 28 of the stator core 16 and a plurality of conductor connectors 40 (which may also be referred to herein as "jumpers"). The segmented conductors 30 are inserted into the slots 28 from a first end 20 (i.e., the "insertion end") of the stator core 16. The segmented conductors 30 are connected together at an opposite end 22 of the stator core 16 (i.e., the "weld end").

FIG. 3 shows an enlarged cross-sectional view of one of the slots 28 of the stator core 16 with the segmented conductors 30 placed in the stator core 16. As shown in FIG. 3, each slot 28 includes two conductors 30, including a first conductor 30a and a second conductor 30b. The conductors 30a, 30b have a width that is small enough for the conductors to fit within the slots 28, but large enough to prevent the conductors from passing through the openings on the inner perimeter surface 24 of the stator core 16. The conductors 30a, 30b may be inserted into the slots from the insertion end 20 of the stator core 16, and extend completely through the slots to the weld end 22 of the stator core 16.

Figure 4:
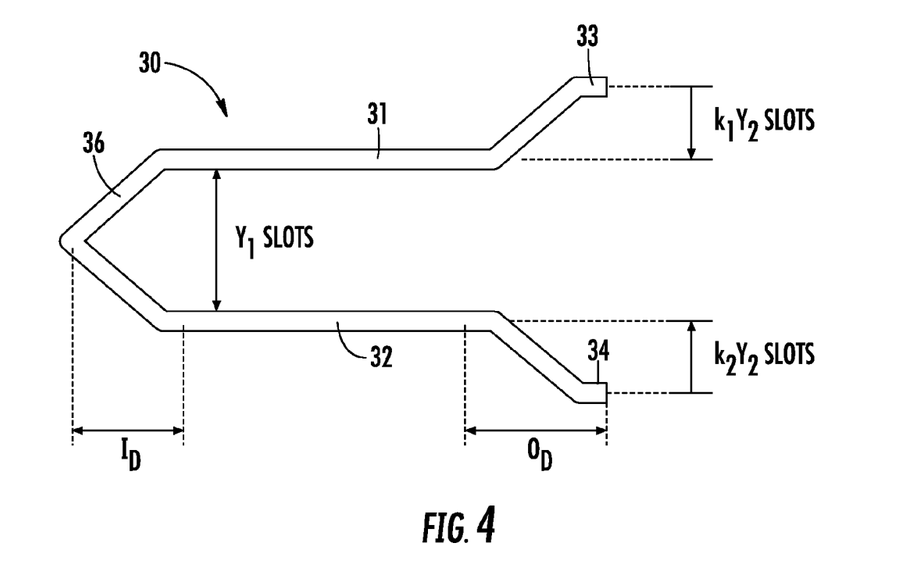
FIG. 4 shows a side view of one of the segmented conductors of FIG. 3.

With reference now to FIGS. 3 and 4, the conductors 30 are generally provided as U-shaped segmented conductors of rectangular cross-section (sometimes referred to as "hairpin conductors"). The conductors 30 are bent and connected at their ends to form the winding arrangement 18 on the stator core 16. The rectangular conductors 30 are arranged in two layers in the slots, with a first layer comprised of first conductor 30a positioned closest to the inner perimeter 24 of the stator, and a second layer comprised of conductor 30b positioned closer to the outer perimeter 26 of the stator. Rectangular conductors 30 arranged in this manner are useful in order to incorporate the advantages of semi-closed or fully-closed slots with a high slot fill ratio.

An exemplary U-shaped conductor 30 of rectangular cross-section is shown in FIG. 4. The U-shaped conductor 30 includes two legs 31 and 32 separated by a U-shaped turn portion 36. Each leg 31, 32 includes an associated leg end 33, 34. The direction of the conductor 30 changes at the U-turn portion 36 such that the electrical path provided by the conductor 30 makes a "U-turn", i.e., a substantially 180° turn, along the U-turn portion 36.

The segmented conductors 30 of FIG. 4 are formed from a straight copper conductor segment with a rectangular cross-section. However, before a segmented conductor 30 is inserted into the stator core 16, a machine bends the segmented conductor 30 in order to create the U-turn portion 36 with two substantially straight legs 31, 32. After the U-turn portion 36 is created, the segmented conductor 30 is inserted into the stator core 16, legs first, from the insertion side 20 of the stator core 16. The legs 31, 32 are inserted into different slots (and in different layers), as noted in FIG. 4 by the designation $Y_1$, showing that the distance between the legs 31, 32 is equal to a distance that traverses a given number of slots 28. The legs 31, 32 are made to pass through the stator slots 28 and extend out the weld end 22 of the stator core 16. After being inserted in the stator core 16, the leg ends 33, 34 are bent by a machine in opposite directions by a predetermined distance, thus moving the leg ends 33, 34 of the conductor another predetermined number of slots. In FIG. 4 this distance is indicated as $k_1 Y_2$ slots and $k_2 Y_2$ slots. Once the conductor 30 is situated in the stator core 16, the U-turn portion 36 will extend a distance $I_D$ from the insertion side 20 of the stator and the leg ends 43, 44 will extend a distance $O_D$ from the weld side 22 of the stator.

Figure 5:
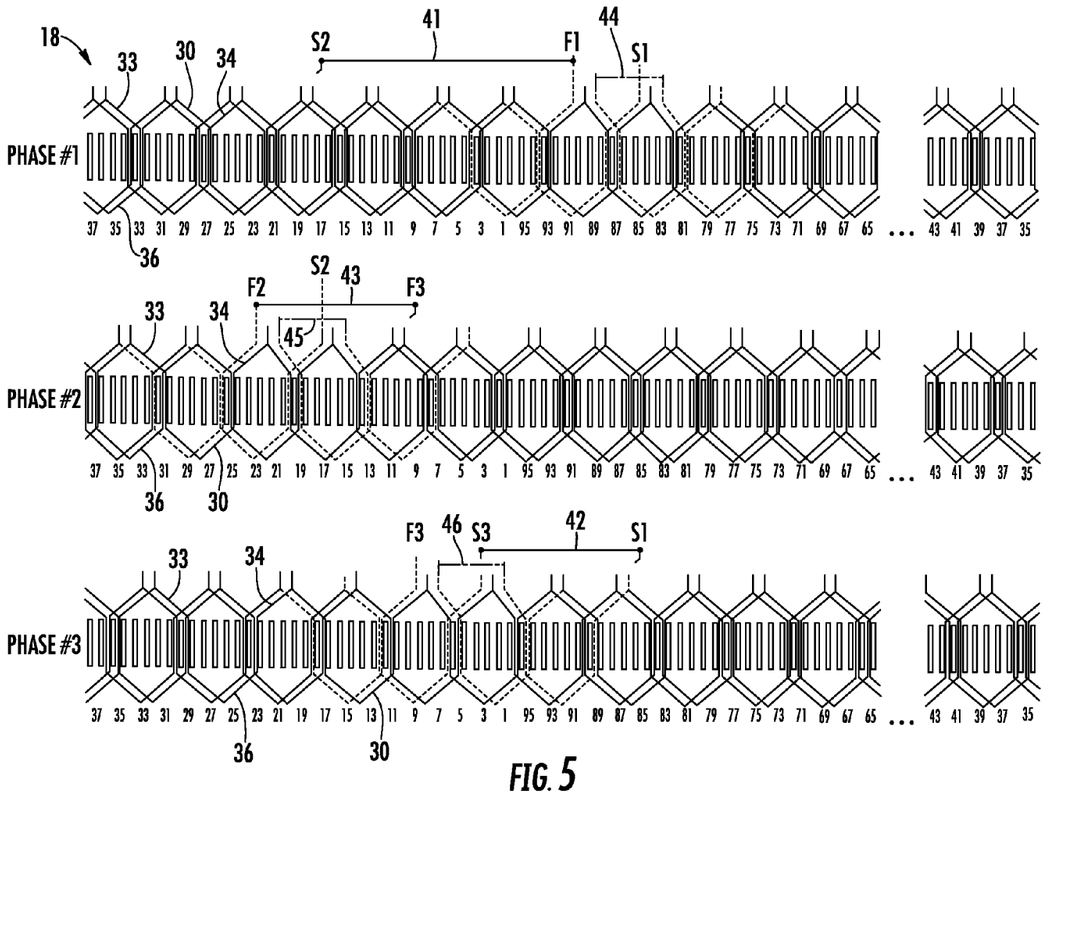
FIG. 5 shows a schematic diagram for the winding connection arrangement of FIG. 1.

Once the conductors 30 are properly positioned in the slots 28 of the stator core, adjacent leg ends 33, 34 are welded together to form a complete winding arrangement 18. An exemplary winding arrangement for the stator 12 is shown in FIG. 5. The exemplary winding arrangement of FIG. 5 is a three phase delta winding arrangement. However, it will be recognized that principles disclosed herein may also be applied to other multi-phase arrangements, such as a Y-winding arrangement. As shown in FIG. 5, the U-turn portions 36 of the conductors 30 are all positioned at the insertion end 20 of the stator core 16, and adjacent leg ends 33, 34 are joined together at the weld end 22 of the stator core 16. Adjacent leg ends 33, 34 may be joined together by any of various known techniques, such as welding or brazing. A plurality of jumpers 40 are also used to join certain non-adjacent leg ends 33, 34 at the weld end 22 of the stator core 16. The jumpers 40 generally extend over or around a plurality of leg ends at the weld end 22 of the stator core 16.

The jumpers 40 in the winding arrangement of FIG. 5 provide phase connections and series winding connection loops for the winding arrangement 18. In particular, the jumpers 40 include a curved phase connection member 41, a first linear phase connection member 42, a second linear phase connection member 43, and three series winding connection loops 44-46. The series winding connection loops 44-46 provide a series connection for two windings in a given phase of the winding arrangement 18. The phase connection members 41-43 connect the various phases of the winding arrangement 18 (i.e., the three phases of the delta winding arrangement of FIG. 5). Accordingly, each phase connection member 41-43 is joined to a terminal of the electric machine by a cable, as explained in further detail below.

With reference now to FIGS. 1 and 6A-6C, the various jumpers 40 used in the winding arrangement 18 on the stator core 16 are shown. These jumpers 40 are provided in different shapes and sizes and are configured to span differing numbers of slots 28 on the stator core 16. The jumpers 40 are generally comprised of the same material as the other conductors 30 of the winding arrangement 18, such as an insulation-coated copper material.

Curved Phase Connection Member

Figure 6A:
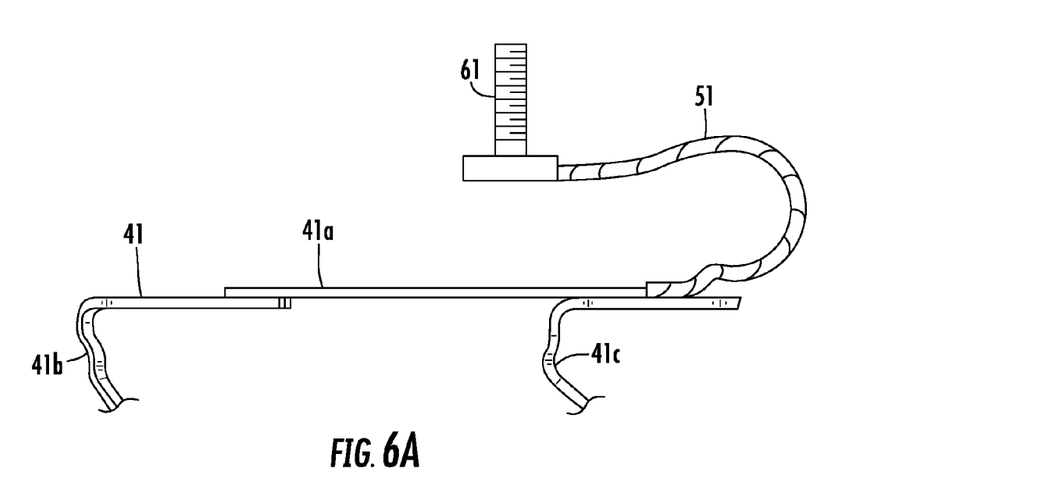
FIG. 6A shows a side view of a jumper providing a curved phase connection for the winding connection arrangement of FIG. 1.

With particular reference to FIGS. 1, 5 and 6A, the curved phase connection member 41 is configured to span twenty-two slots on the winding arrangement 18 (i.e., from slots 94 to 20 as noted in FIG. 5). The curved phase connection member 41 includes a curved or arc-shaped portion 41a that extends between two legs 41b and 41c. In the embodiment of FIG. 6A, the arc-shaped portion 41a is formed from three different conductor sections. These conductor sections are joined together by arc welding or another connection method to form the curved arc-shaped portion 41a. In other embodiments, the arc-shaped portion 41a and legs 41b, 41c may be a single integral piece.

As best seen in FIG. 1, the arc-shaped portion 41a of the curved phase connection member 41 is configured to follow the circumferential perimeter of the stator core 16 at a position above (or axially outward from) the leg ends 33, 34 of the other conductors 30 of the winding arrangement 18. This position of the curved phase connection member 41 is at the same height on the stator core 16 at the other two phase connection members 42, 43 and the three series windings connection loops 44-46, also shown in FIG. 1. However, in at least one alternative embodiment, the curved phase connection member 41, the first and second linear phase connection members 42, 43, and the three series winding connection loops 44-46 may be staggered in height at the weld end 22 of the stator core 16.

Figure 7:
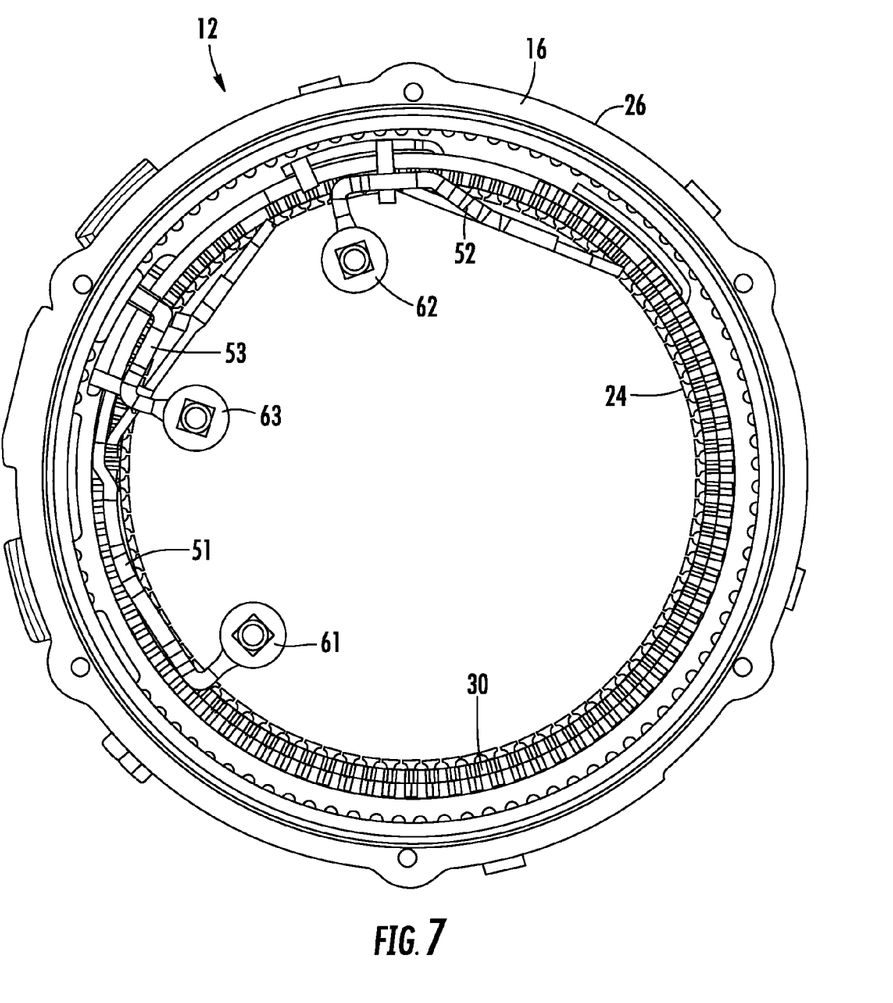
FIG. 7 shows a top view of the stator of FIG. 1 with terminals attached to the jumpers.

As shown in FIGS. 6A and 7, a flexible cable 51 is coupled to the curved phase connection member 41 at a tapping point on the connection member 41. The tapping point on the connection member 41 of FIG. 6A is located at a position near an end of the arc-shaped portion 41a, and past the legs 41b and 41c of the curved phase connection member 41. The flexible cable 51 is generally a braided or stranded cable as is commonly used in association with terminal connections on electric machines. A first end of the flexible cable 51 is coupled to the curved phase connection member 41 and a second end of the flexible cable 51 is coupled to a terminal 61 for the electric machine 10. The terminal 61 facilitates connection of the electric machine to a rectifier, as is known in the art.

Linear Phase Connection Members

Figure 6B:
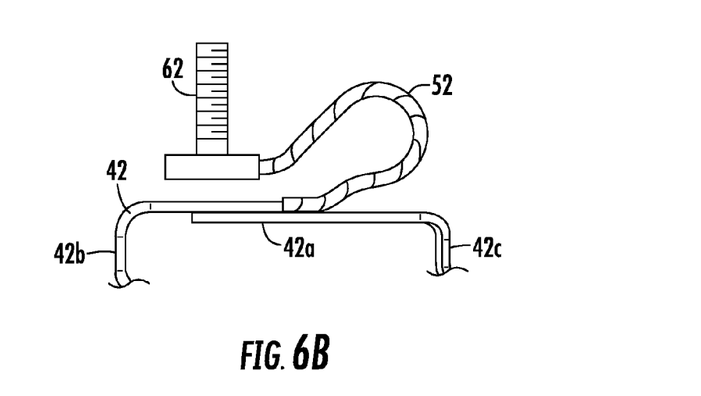
FIG. 6B shows a side view of a jumper providing a first linear phase connection for the winding connection arrangement of FIG. 1.

With reference now to FIGS. 1, 5 and 6B, the first linear phase connection member 42 is configured to span fourteen slots on the winding arrangement 18 (i.e., from slots 88 to 6 as noted in FIG. 5). The first linear phase connection member 42 includes a substantially linear or straight portion 42a that extends between two legs 42b and 42c. In the embodiment of FIG. 6B, the straight portion 42a is formed from two different conductor sections. These conductor sections are joined together by arc welding or another conductive connection method to form the straight portion 42a. In other embodiments, the straight portion 42a and legs 42b, 42c may be a single integral piece.

As best shown in FIG. 1, the straight portion 42a is positioned within an inner cylindrical space 17 defined by the stator core 16. This inner cylindrical space 17 is bordered by a cylinder that extends in the axial direction along the inner perimeter wall 24 of the stator core 16. This cylinder is represented in FIG. 2 by dotted lines 17a, with the space inside of the dotted lines 17a being the inner cylindrical space 17. With the straight portion 42a of the phase connection member 42 positioned within this inner cylindrical space, the straight portion 42a of the first linear phase connection member 42 appears as a chord of the circular end shape of the stator core 16 when the stator core is viewed from the weld end 22, as shown in FIG. 1. The straight portion 42a may be provided at a position above (or axially outward from) the leg ends 33, 34 of the other conductors 30 of the winding arrangement 18. Alternatively, the straight portion 42a may be at the same height as the leg ends 33, 34.

As shown in FIGS. 6B and 7, a flexible cable 52 is coupled to the first linear phase connection member 42 at a tapping point on the connection member 42. The tapping point on the linear phase connection member 42 of FIG. 6B is centrally located on the straight portion 42a between the legs 42b and 42c. The flexible cable 52 is generally a braided or stranded cable with a first end of the flexible cable 52 coupled to the first linear phase connection member 42 and a second end of the flexible cable 52 coupled to a terminal 62 for the electric machine 10, as shown in FIG. 7. The terminal 62 facilitates connection of the electric machine to a rectifier bridge, as is known in the art.

The second linear phase connection member 43 is identical in shape to the first linear phase connection member 42 shown in FIG. 6B. Accordingly, the second linear phase connection jumper 43 is also configured to span fourteen slots on the winding arrangement 18 (i.e., from slots 12 to 26 as noted in FIG. 5). The straight portion 43a of the second linear phase connection member 43 is also positioned within the inner cylindrical space 17 defined by the stator core 16. Thus, the straight portion 43a of the second linear phase connection member 43 appears as a chord of the circular end shape of the stator core 16 when the stator core is viewed from the weld end 22, as shown in FIG. 1. A flexible cable 53 is also coupled to the second linear phase connection member 43. This flexible cable 53 includes a first end coupled to the second linear phase connection member 43 at a tapping location and a second end coupled to a terminal 63 for the electric machine 10, as shown in FIG. 7. The terminal 63 facilitates connection of the electric machine to a rectifier, as is known in the art.

As described above, and as shown in FIG. 1, the first and second linear phase connection members 42 and 43 are formed to make straight line connections within the electric machine 10, each appearing as a chord in a circle. In this embodiment, both the first and second linear phase connection members 42 and 43 are positioned to the inside of the plurality of conductor segments (i.e., closer to the center axis 92 of the cylindrical stator core 16) and extend across the stator core 16 in a direction that is perpendicular to the radial direction (i.e., a direction perpendicular to the radial direction noted by arrow 90 in FIG. 1). It will be recognized that the substantially linear form of these two phase connections members 42, 43 is distinct from other circumferential arc-shaped jumpers (e.g., 41 and 44-46) and other stator interconnections, thus allowing for more spatial clearance between the jumpers and conductor connections within the winding arrangement 18.

Series Winding Connection Loops

Figure 6C:
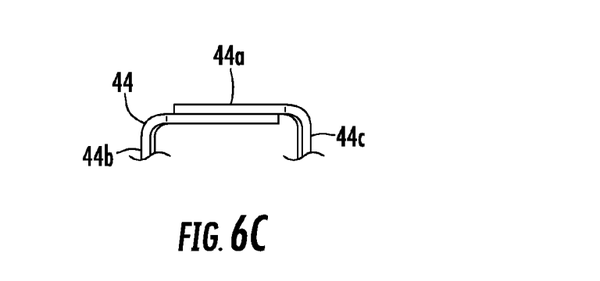
FIG. 6C shows a side view of a jumper providing a series winding connection loop for the winding connection arrangement of FIG. 1.

With reference now to FIGS. 1, 5 and 6C, three series winding connection loops 44-46 are included as jumpers in the winding arrangement 18. Each series winding connection loop 44-46 is configured to span six slots on the winding arrangement 18 (i.e., from slots 81 to 87, 13 to 19, or 95 to 5, as noted in FIG. 5). Each series winding connection loop is identically shaped. As shown in FIG. 6C, connection loop 44 includes an arc-shaped portion 44a that extends between two legs 44b and 44c. In the embodiment of FIG. 6C, the connection loop 44 is formed from two different conductor sections. These conductor sections are joined together by arc welding or another conductive connection method to form the connection loop 44. In other embodiments, the arc-shaped portion 44a and legs 44b, 44c may be a single integral piece.

As best seen in FIG. 1, the series winding connection loops 44-46 are configured to follow outside of the circumferential perimeter of the stator core 16 at a position above (or axially outward from) the leg ends 33, 34 of the other conductors 30 of the winding arrangement 18. In at least one alternative embodiment, the series winding connection loops 44-46 are configured to follow inside of the circumferential perimeter of the stator core. The axial position of each series winding connection loop 44-46 is about the same axial position on the stator core 16 as the phase connection members 41-43. However, in some embodiments, the series winding connection loops 44-46 may be above or below the phase connection members 41-43 on the stator core 16.

The phase connection members 41-43 and the series windings connection loops 44-46 are tied together on the stator core 16 using electrically insulative material that tightly wraps around the conductors and/or between the conductors in order to improve the rigidity of the termination scheme and better resist destructive vibration. Insulating sleeves may also be used to protect the conductors(s) from undesirable contact with other components.

In sections where the jumpers 40 are located in the same radial position(s) on the diameter, they are generally staggered in height to provide clearance. Where the above described straight connections on the first and second linear phase connection members 42 and 43 intersect the curved phase connection member 41, these conductors may also be physically tied with the curved connector and series windings connection loops 44-46 to improve system rigidity.

The foregoing detailed description of one or more embodiments of the stator winding connection arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A stator for an electric machine comprising:
a cylindrical stator core including an outer perimeter surface and an inner perimeter surface with a plurality of slots formed between the inner perimeter surface and the outer perimeter surface, the inner perimeter surface defining an inner cylindrical space that extends in an axial direction within the stator, the inner cylindrical space extending past the cylindrical stator core;
a plurality of conductor segments positioned in the plurality of slots; and
a jumper including a straight portion extending into the inner cylindrical space and connecting two of the plurality of conductor segments, the jumper providing a phase connection member including a phase tapping location where a phase terminal is connected to the phase connection member.

2. The stator of claim 1 wherein the jumper includes a leg at an end of the straight portion coupled to one of the plurality of conductor segments.

3. The stator of claim 2 wherein each of the opposing ends of the stator core define a circular shape, and wherein the straight portion of the jumper appears as a chord of the circular shape when viewed from one of the opposing ends the stator core.

4. The stator of claim 3 wherein the jumper is a first jumper, the stator further comprising a second jumper connecting another two of the plurality of conductor segments.

5. The stator of claim 4 wherein the second jumper is generally arc shaped and appears to extend along the circular shape when viewed from the one of the opposing ends of the stator core.

6. The stator of claim 5 wherein the first jumper and the second jumper are tied together with an electrically insulative material.

7. The stator of claim 1 wherein the plurality of conductor segments are connected to form a multi-phase winding on the stator.

8. The stator of claim 7 wherein the phase connection member is a first phase connection member, the stator further comprising a second phase connection member and a third phase connection member, wherein the second phase connection member includes a straight portion that extends within the inner cylindrical space between another two of the plurality of conductor segments, and wherein the third phase connection member includes an arcuate portion that extends along one of the opposing ends of the stator core between yet another two of the plurality of conductor segments.

9. The stator of claim 1 wherein the plurality of conductor segments includes a plurality of series connected phase windings on the stator core, and wherein the stator further comprises a plurality of series winding connection loops, each series winding connection loop including an arcuate portion that extends along one of the opposing ends of the stator core and connects two of the phase windings in series.

* * * * *